US010178238B2

(12) United States Patent
Pieda et al.

(10) Patent No.: US 10,178,238 B2
(45) Date of Patent: *Jan. 8, 2019

(54) METHOD AND SYSTEM FOR DYNAMIC CELLULAR NETWORKING ACTIVATION FOR VIRTUAL SIM SERVICE

(71) Applicants: BlackBerry Limited, Waterloo (CA); 2236008 Ontario Inc., Waterloo (CA)

(72) Inventors: Peter Steven Pieda, Ottawa (CA); Sivakumar Nagarajan, Ottawa (CA); Mark De Abreu, Ottawa (CA); Barry Fraser Yerxa, Ottawa (CA); Pierre Pierre Blais, Kanata (CA); Thomas Leonard Trevor Plestid, Ottawa (CA); Kevin Paul Fernandes, Toronto (CA)

(73) Assignees: BlackBerry Limited, Waterloo (CA); 2236008 Ontario Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/730,387

(22) Filed: Oct. 11, 2017

(65) Prior Publication Data

US 2018/0034974 A1  Feb. 1, 2018

Related U.S. Application Data

(63) Continuation of application No. 14/725,450, filed on May 29, 2015, now Pat. No. 9,794,418.

(51) Int. Cl.
H04M 15/00 (2006.01)
H04L 12/14 (2006.01)
(Continued)

(52) U.S. Cl.
CPC ........ *H04M 15/07* (2013.01); *H04L 12/1471* (2013.01); *H04M 15/751* (2013.01);
(Continued)

(58) Field of Classification Search
CPC ........................... H04W 12/06; H04L 41/046
(Continued)

(56) References Cited

U.S. PATENT DOCUMENTS 8,996,002 B2   3/2015  Rodgers
9,014,174 B2   4/2015  Williams et al.
(Continued)

FOREIGN PATENT DOCUMENTS

EP   2680663 A1   1/2014
EP   2696553 A1   2/2014
(Continued)

OTHER PUBLICATIONS

Movirtu, Building an enterprise mobility management ecosystem for telcos, May 7, 2015.
(Continued)

*Primary Examiner* — Kiet M Doan
(74) *Attorney, Agent, or Firm* — Moffat & Co

(57) ABSTRACT

A method at a user equipment to facilitate activation and splitting of data billing between at least two parties, the method including starting, at the user equipment, a virtual subscriber identity module platform ('VSP') service on the user equipment; verifying VSP configuration information with a network server; upon verification, starting a data networking access point name ('APN') based on the configuration information on the user equipment; and setting a status indicator on the user equipment to indicate the VSP service is enabled.

20 Claims, 11 Drawing Sheets

(51) Int. Cl.
*H04W 4/24* (2018.01)
*H04W 8/18* (2009.01)

(52) U.S. Cl.
CPC ....... *H04M 15/7556* (2013.01); *H04M 15/77* (2013.01); *H04M 15/771* (2013.01); *H04W 4/24* (2013.01); *H04L 12/1467* (2013.01); *H04M 15/774* (2013.01); *H04W 8/183* (2013.01)

(58) Field of Classification Search
USPC ...... 455/407, 558, 411, 419, 435.2; 726/5, 7
See application file for complete search history.

(56) References Cited

U.S. PATENT DOCUMENTS

| | | |
|---|---|---|
| 2009/0298466 A1 | 12/2009 | Guo |
| 2010/0100945 A1* | 4/2010 | Ozzie ..................... G06F 21/35 726/5 |
| 2012/0264400 A1 | 10/2012 | Khan et al. |
| 2013/0054763 A1 | 2/2013 | Van der Merwe et al. |
| 2013/0102276 A1 | 4/2013 | Raj et al. |

FOREIGN PATENT DOCUMENTS

| | | |
|---|---|---|
| JP | 2011192129 A | 9/2011 |
| WO | 2008040964 A2 | 4/2008 |

OTHER PUBLICATIONS

Movirtu, Movirtu Buzz Apr. 2013, Apr. 2013.
Movirtu, Movirtu Buzz Jun. 2014, Jun. 2014.
Movirtu, Movirtu CloudPhone: First to extend virtual mobile numbers to tablets and laptops for mobile calling, Jun. 2, 2014.
Movirtu, Movirtu CloudPhone Product Sheet v3, May 7, 2015.
Movirtu, Movirtu ManyMe Press Release, Feb. 18, 2013.
Movirtu, Movirtu ManyMe Product Sheet v10, May 7, 2015.
Movirtu, Movirtu Share Product Sheet v9, May 7, 2015.
Movirtu, Movirtu WorkLife Press Release, Feb. 18, 2013.
Movirtu, Movirtu WorkLife Product Sheet v11, May 7, 2015.
European Patent Office, Communication from the Examining Division for Application No. 16171788.9, dated Jan. 22, 2018.

* cited by examiner

108a

| Destination | Gateway | Flags | Refs | Use | Mtu | Interface |
|---|---|---|---|---|---|---|
| Internet: | | | | | | |
| Default | 25.48.90.206 | UG | 13 | 66 | - | msm0 |
| 25.48.90.204/30 | link#6 | UC | 2 | 0 | - | msm0 |
| 25.48.90.206 | link#6 | UHLC | 1 | 0 | - | msm0 |
| 25.48.90.207 | link#6 | UHLC | 2 | 70 | - | msm0 |
| 127.0.0.1 | 127.0.0.1 | UH | 0 | 161 | 33192 | lo0 |
| 127.0.0.2 | 127.0.0.2 | UH | 0 | 0 | 33192 | lo1 |
| 127.0.0.3 | 127.0.0.3 | UH | 0 | 0 | 33192 | lo2 |
| 169.254.208.100/30 | link#7 | UC | 2 | 0 | - | ecm0 |
| 169.254.208.102 | 72:d4:f2:d1:15:ca | UHLC | 4 | 42 | - | ecm0 |
| 169.254.408.103 | link#7 | UHLC | 2 | 21 | - | ecm0 |

FIG. 2

METHOD AND SYSTEM FOR DYNAMIC CELLULAR NETWORKING ACTIVATION FOR VIRTUAL SIM SERVICE

FIELD OF THE DISCLOSURE

The present disclosure relates to mobile devices and in particular relates to mobile devices having both work and personal applications.

BACKGROUND

The use of user equipment (UE) or mobile devices, including smartphones, cellphones, laptops, digital pagers, among others, is becoming more prevalent. Many of these UEs have at least one cellular connection which may be used for both circuit switch and packet switch calls. Such cellular connections are usually based on a subscription or pre-paid plan with a cellular provider.

In order to access the cellular provider's network, a smart card such as a universal integrated circuit card (UICC) is typically found on such devices, where the UICC has one or more applications used for subscriber identity verification. Such applications may, for example, include a subscriber identity module (SIM) application or a universal subscriber identity module (USIM) application for the global system for mobile communication (GSM) networks, for a universal mobile telecommunications system (UMTS system) or long term evolution (LTE) system, a code division multiple access (CDMA) subscriber identity module application (CSIM application) for a CDMA 2000 network, a remote-user identity module (RUIM) for a CDMA network, IP multimedia services (IMS) subscriber identity module (SIM) for IMS services, among others. Once authenticated to the network, the user equipment may then exchange voice or data, depending on the subscription with the cellular network.

One trend in the workplace is to bring your own device (BYOD) policy for employers, where employees may bring their own device and be connected to enterprise services on that device. However, allocation of resources and billing for such systems is complex, since it is difficult to distinguish between personal and work phone calls, text messages, and data usage and the associated costs and billing between the two. A similar trend exists for corporate owned and personal enabled (COPE) devices, where employees are issued a corporate device that may be connected to personal services and applications.

BRIEF DESCRIPTION OF THE DRAWINGS

The present disclosure will be better understood with reference to the drawings, in which:

FIG. 2 is an example forwarding information base;

DETAILED DESCRIPTION OF THE DRAWINGS

Figure 1:
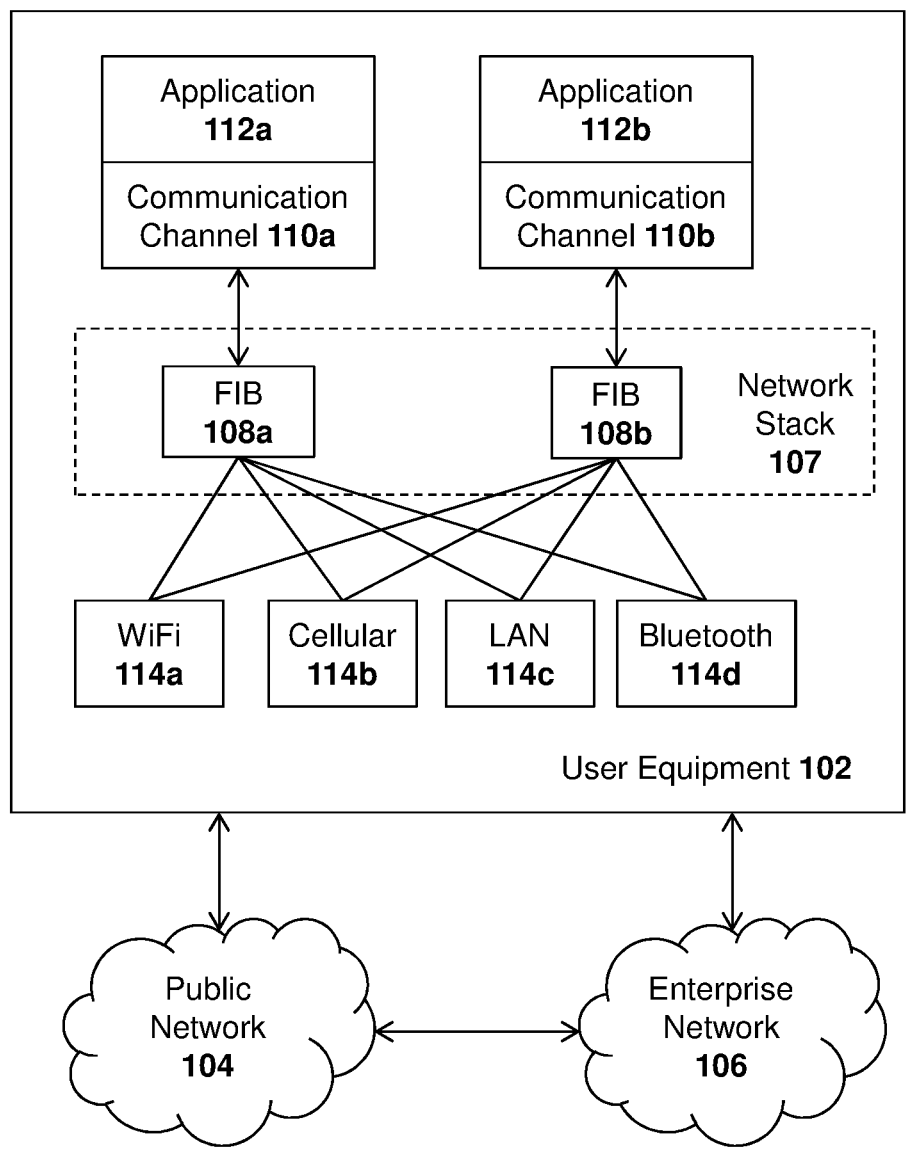
FIG. 1 is an example communication system using each of multiple forwarding information bases (MFIBs) for different applications.

The present disclosure provides a method at a user equipment to facilitate activation and splitting of data billing between at least two parties, the method comprising: starting, at the user equipment, a virtual subscriber identity module platform ('VSP') service on the user equipment; verifying VSP configuration information with a network server; upon verification, starting a data networking access point name ('APN') based on the configuration information on the user equipment; and setting a status indicator on the user equipment to indicate the VSP service is enabled.

The present disclosure further provides a user equipment configured to facilitate activation and splitting of data billing between at least two parties, the user equipment having a processor; and a communications subsystem, wherein the user equipment is configured to: start a virtual subscriber identity module platform ('VSP') service on the user equipment; verify VSP configuration information with a network server; upon verification, start a data networking access point name ('APN') based on the configuration information on the user equipment; and set a status indicator on the user equipment to indicate the VSP service is enabled.

The present disclosure further provides a non-transitory computer readable medium comprising instructions that, when executed by a processor of a user equipment, are configured to facilitate activation and splitting of data billing between at least two parties, the instructions providing: starting, at the user equipment, a virtual subscriber identity module platform ('VSP') service on the user equipment; verifying VSP configuration information with a network server; upon verification, starting a data networking access point name ('APN') based on the configuration information on the user equipment; and setting a status indicator on the user equipment to indicate the VSP service is enabled.

Specifically, the present disclosure relates to the addition of one or more identities on a device to allow split billing between such identities. For example, a work and personal plan can be added to a single device, where work phone calls, text messages and data used for work applications may be billed to an employer, whereas personal phone calls, text messages and data usage may be billed to an individual user of the device. However, the present disclosure is not limited to a work and personal split, and the addition of multiple plans to a device is contemplated by the present disclosure. For example, in another embodiment a device may be split between two users and each user may have a separate plan on the device.

In accordance with one embodiment of the present disclosure, multiple billing plans are implemented utilizing a virtual SIM platform (VSP) at a carrier which allows the user to have multiple phone lines in a single SIM in a phone. As used herein, a SIM can be any identity module. Such split allows a user to have voice and data split billing between the work and personal lines.

In accordance with one embodiment of the present disclosure, one issue for data networking over cellular is that resources may need to be allocated for such data networking. However, if such resources are allocated before the service is enabled or activated on a user equipment, a carrier may have internet protocol (IP) and other resources allocated for a phone in their network without having such corresponding service activated. This will cause the carrier to waste resources for devices who do not have such service allocated.

Thus, in accordance with the embodiments of the present disclosure, the cellular data network for work traffic is not activated until the virtual SIM service has been started and verified with the VSP at the carrier network.

Specifically, when an enterprise activates the VSP service on the UE, a VSP daemon on the UE can start a VSP application. The VSP application may do the registration authentication and if successful, the VSP daemon may then start the data networking access point name (APN) based on configuration information stored within the UE. Upon starting the data networking APN, the UE may then send a system indicator that such APN is configured, allowing the carrier then to accept data over such APN.

Conversely, when the service is disabled, such as when the user leaves the services, then the APN may shut down.

Each of the processes for bring up and taking down an APN are described below.

Reference is now made to FIG. 1, which shows an exemplary simplified diagram of a communications system. The communications system includes user equipment 102 communicably coupled to a public network 104 and an enterprise network 106. The UE 102 comprises a network stack 107 including multiple forwarding information bases (FIBs).

In some implementations, a forwarding information base is a data structure that associates destination with communication interface information. Such communication interface information may for example include a physical interface.

A UE may have multiple FIBs (MFIBs). In this case, the UE may route communication based on various criteria. For example, different FIBs may be assigned to different applications. In other cases, different FIBs may be used for different prioritization of shared network resources. For example, one FIB may be associated with a trust domain or perimeter for work applications and may give higher priority to certain interfaces within the FIB. In other cases, different FIBs may prioritize networks by type based on a policy decision made external to the UE, such as by a user, corporation, among others.

In the example of FIG. 1, a UE 102 includes two FIBs, namely FIB 108*a* and FIB 108*b*. However, this is merely an example and in other cases more FIBs could be included on the device. For example, a device may have a FIB for personal applications, a FIB for work and secure applications, a FIB for tethering, and a FIB for enterprise administration.

Each FIB is associated with a communication channel (110*a* and 110*b*) from applications (112*a* and 112*b*).

Various interfaces, including Wi-Fi 114*a*, cellular 114*b*, local area network (LAN) 114*c* and Bluetooth™ 114*d* are shown in UE 102.

The Network Stack 107 may receive requests to access the FIB 108*a*, 108*b*. If access to the requested FIB 108*a*, 108*b* is granted, the FIB 108*a*, 108*b* may provide routing information to the Application 112*a*, 112*b* from which the request originated. In some cases, the Network Stack 107 may merely receive a communication and determine which FIB 108*a*, 108*b* is mapped to the Communication Channel 110*a*, 110*b*.

In FIG. 1, communication channel 110*a* routes communication for application 112*a* based on the routing information provided by FIB 108*a*, and the communication channel 110*b* routes communication for application 112*b* based on the routing information provided by FIB 108*b*. Applications 112*a* and 112*b* may be configured to provide services to one or more users, and each of the physical interfaces 114*a*-*d* may communicate with at least one of the public network 104 or the enterprise network 106.

UE 102 may comprise a tablet, mobile device, personal computer, laptop computer, among others. The embodiment of FIG. 1 is however not meant to be limiting and other devices could be used.

UE 102 generally includes a processor which controls the overall operation of the device. Processor interacts with device subsystems such as for example a display, memory, auxiliary input/output (I/O) subsystems, serial port, one or more keyboards or keypads, where keyboard or keypad may comprise a physical keyboard or a virtual keyboard or both, one or more speakers, microphone, other communication subsystem such as a short-range communications subsystem, including Bluetooth and near field communications, and any other device subsystems. Serial port could include a USB port or other port.

Memory of UE 102 may be segregated into various modes of operation, sometimes referred to as perimeters, as described below. Such segregation may be physical or logical. Operating system software used by the processor may be stored in such memory. The operating system, specific device applications, or parts thereof, may be temporarily loaded into a volatile memory such as random access memory (RAM).

Applications may be loaded onto the device and associated with a mode of operation (also called a 'perimeter') in some cases. In some embodiments, such applications and data for the application may be stored in memory and associated with the perimeter. For example, separate areas of memory may be used to store the applications or data for each perimeter in some embodiments. In other embodiments, applications or data may be encrypted with a key associated with a perimeter and applications or data for a plurality of perimeters may be stored together. Other options are possible.

In the example of FIG. 1, network stack 107 may include any software, hardware, firmware or combination thereof configured to coordinate communication with applications 112*a* and 112*b* using the FIBs 108*a* and 108*b* and the physical interfaces 114*a*-*d*. For example, the network stack 107 may verify whether a requesting application 112*a* has been granted permissions for access to FIB 108*a* and, if so, provide the application 112*a* access to the FIB 108*a*. In some cases, the network stack 107 may manage FIBs 108*a* and 108*b* and manage connection of communication channels 110*a* and 110*b* with FIBs 108*a* and 108*b*.

FIBs 108*a* and 108*b* may include any parameters, variables, policies, algorithms, instructions, settings or rules for routing communication to at least one of the Public Network 104 or the Enterprise Network 106. For example, the FIB 108*a*, 108*b* may map a destination address to a Physical Interface 114*a*-*d*, another FIB, another communication channel or others. In general, the FIB 108*a*, 108*b* may be any data structure configured to map or otherwise associate a destination address to a Physical Interface 114*a*-*d*. However, FIBs 108*a*, 108*b* may equally be comprised of any other data structure and still be within the scope of the present disclosure.

In some cases, FIBs 108*a*, 108*b* may include or otherwise identify one or more of the following: destination network address (destination; address of the outgoing interface (gateway); state of the route (flag); current number of active uses for the route (refs); count of the number of packets sent using that rough (use); maximum transmission unit (Mtu); physical interface (interface); or others.

The communication channel 110*a*, 110*b* can include any software, hardware, firmware or combination thereof configured to route communication from application 112*a*, 112*b* to at least one of the public network 104 or the enterprise network 106. For example, the communication channel 110*a*, 110*b* may be an inter-process communication (IPC) channel between the application and the network stack configured to determine a physical interface 114*a-d* to route communication based on the FIB 108*a*, 108*b*.

In some implementations, the communication channel 110*a*, 110*b* may be one endpoint of a two-way communication link between an application 112*a*, 112*b* and an application running in the public network 104 or the enterprise network 106. For example, the communication channel 110*a*, 110*b* may be bound to a port number for a physical interface 114*a-d* so that the transmission control protocol (TCP) layer can identify the application 112*a*, 112*b* to which data is destined to be sent. In some cases, an application 112*a*, 112*b* may access the same communication channel 110*a*, 110*b* for all communications and the communication channel 110*a*, 110*b* may switch between accessing the different FIBs 108*a*, 108*b*.

The applications 112*a*, 112*b* may be any application, program, module, process or software that may execute, change, delete, generate or otherwise manage information, such as business information, according to the present disclosure. For example, the application 112*a*, 112*b* may include a notification application, a contacts application, a calendar application, a messaging application or others. Further, while illustrated as internal to UE 102, one or more processes associated with the application 112*a*, 112*b* may be stored, references or executed remotely.

In some cases, applications 112*a*, 112*b* may be configured to access different perimeters, such as a personal perimeter or an enterprise perimeter.

In connection with determining an interface 114*a-d*, the application 112*a*, 112*b* may execute one or more of the following: determine a FIB 108*a*, 108*b* based on MFIBs assigned to the application 112*a*, 112*b*; transmit a request for access to a FIB 108*a*, 108*b* to the network stack 107; determine a physical interface 114*a-d* for the destination based on an assigned FIB 108*a*, 108*b*; determine whether an assigned FIB 108*a*, 108*b* identifies a further FIB 108*a*, 108*b* to use to identify the physical interface 114; determine the physical interface 114 to be used based on the destination of a communication and the further FIB 108*a*, 108*b*; or others.

UE 102 may include interfaces 114*a-d* for communication with other computer systems over at least one of the public network 104 or the enterprise network 106 in a client-server or other distributed environment. In certain implementations, the UE 102 receives data form internal or external senders through interfaces 114*a-d* for local storage, processing or both.

Generally, interfaces 114*a-d* comprise logic encoded in software, hardware, firmware or a combination thereof operable to communication with at least one of the public network 104 or the enterprise network 106. More specifically, the interfaces 114*a-d* may comprise software supporting one or more communication protocols associated with the public network 104 or the private or enterprise network 106, or comprise hardware operable to communicate physical signals.

The examples of interfaces 114*a-d* in FIG. 1 are merely illustrative, and other interfaces are possible. The present disclosure is not limited to the particular interfaces shown in the figure.

Reference is now made to FIG. 2, which illustrates an example FIB108*a*. In particular, FIB 108*a* comprises a routing table which may include a destination column 202, a gateway column 204, flags column 206, refs column 208, use column 210, Mtu column 212 and interface 114. The destination column 202 may identify a destination network address. The gateway 204 may identify an address of the outgoing interface. The flags column 206 may identify a state of the route. The use column 210 may identify a count of the number of packets sent using that route. The Mtu column 212 may identify a maximum transmission unit. The interface 114 may identify a physical interface.

Thus, for example, FIB 108*a* may map or otherwise associate a destination network address to a physical interface 114. As illustrated in the example of FIG. 2, the address "25.48.90.204/30" maps to the "msm0" at the physical interface. In addition to interfaces 114, the FIB 108*a* may map or associate a destination network address to a different FIB, another communication channel 110, or other elements.

Figure 3:
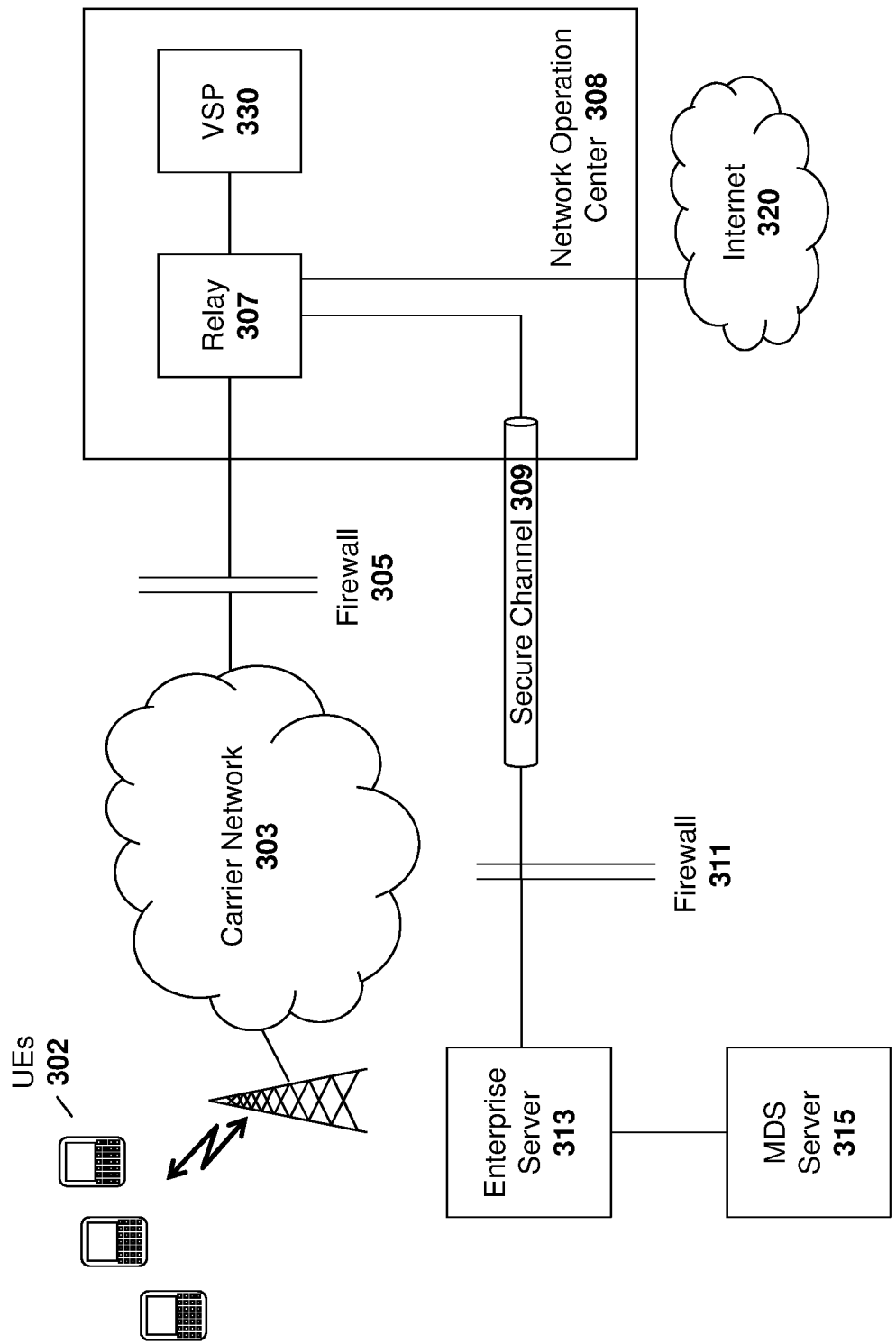
FIG. 3 is a block diagram showing a user equipment communicating through a carrier network with either public or enterprise servers.

The above device may be used with various networks. Reference is now made to FIG. 3, which shows a block diagram of an example wireless data network in accordance with the present disclosure and with which the various embodiments of the methods of the instant disclosure may cooperate.

In the example of FIG. 3, UEs 302 are connected over a mobile carrier network 303 for communication through a firewall 305 to a relay 307 within a network operation center 308. A device that receives policies through an enterprise mobility management server, such as a BlackBerry Enterprise Service, may use such infrastructure. As seen in FIG. 3, communication from one of UEs 302 is received at relay 307 and passed via a secure channel 309 through firewall 311 to a corporate enterprise server 313 and corporate mobile data system (MDS) server 315.

Similarly, policies and data may be pushed from enterprise server 313 to a UE 302 through firewall 311, over secure channel 309 to relay 307, where the policies and data are pushed through firewall 305, over carrier network 303 to a UE 302.

A device that includes both personal and work spaces or applications may interact both with the enterprise servers, such as server 313 and MDS server 315, as well as over carrier network 303 to the internet 320, for example for personal applications.

A module within a network operation center that is carrier controlled is shown in FIG. 3 as virtual SIM platform (VSP) 330, which may provide a virtual SIM for a UE 302. In particular, VSP 330 may allow a UE 302 to have a real SIM from the carrier, as well as a virtual SIM. The combination of the real SIM and virtual SIM allow a device 302 to have a plurality of voice and data connections to a cellular network as described below.

Utilizing the above architecture, data billings split can be provided in two ways. A first method is to use a dual access point name (APN) in which there are two APNs provided by a carrier. A carrier may then track how much data is utilized on each APN.

In a second embodiment, counters may be used. In this case, the carrier only has one APN but needs to count on the device how much data is sent via the work or personal spaces. While the counter may be used in certain circumstances, the description below will utilize the dual APN process.

In order to support split billing on a device in accordance with the embodiments described below, the device will need to support a VSP service. Once the VSP service is configured for both voice and data, interactions with the network through the carrier may be routed on different interfaces, allowing the carrier to bill the circuit switched or packet switched calls correctly. Specifically, on a VSP device activation, a second data APN can be added along with a work cellular logical interface. Data over the second APN may then be considered work data and billed appropriately.

Figure 4:
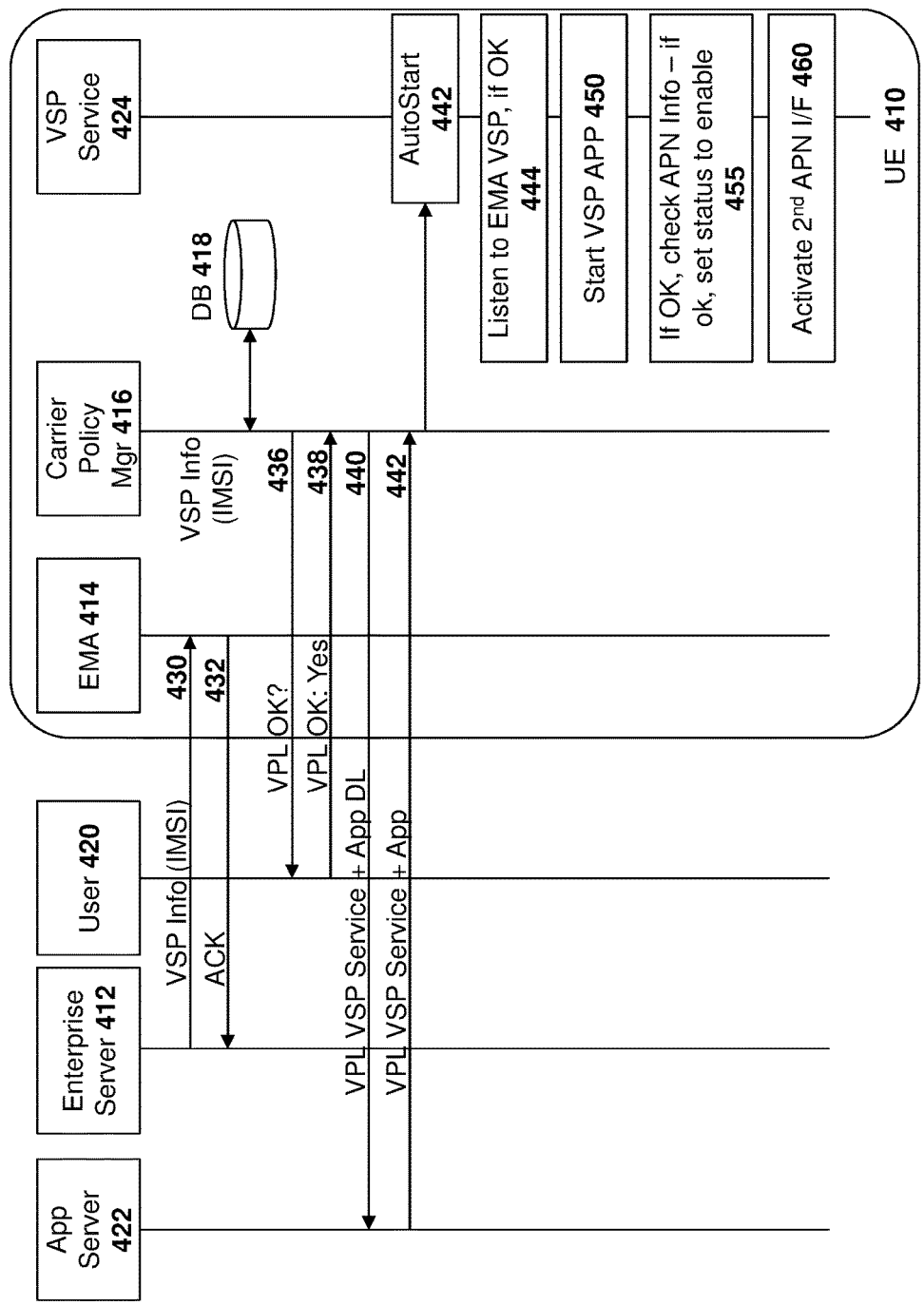
FIG. 4 is a data flow diagram showing initialization of a VSP service on a user equipment.

Reference is now made to FIG. 4. In FIG. 4, a data flow is shown for enabling the virtual number and data connection for a UE 410. In particular, an enterprise may wish to have both a work and a personal billing enabled on a UE 410. In this case, an enterprise server 412 obtains, from a VSP server 330, a virtual phone number from the VSP. The enterprise server 412 may then send VSP information for a UE 410, including the virtual phone number, as well as other information. Such information may include, for example, an identifier, such as an international mobile subscriber identity (IMSI), that was obtained from UE 410 when a SIM card was inserted.

The enterprise server 412 communicates with an enterprise management agent (EMA) 414 on UE 410. Enterprise server 412 may push the previously obtained VSP information to the enterprise management agent 414, as shown by message 430. In one embodiment, an identifier is also pushed to the UE 410. For example, such identifier may be an international mobile subscriber identity (IMSI) created for the virtual SIM.

The enterprise management agent 414 may receive the message 430 from enterprise server 412 and consider this to be a policy of the enterprise and cause actions to be taken on UE 410. Further, enterprise management agent 414 sends acknowledgement message 432 back to the enterprise server 412.

Enterprise management agent 414 may store the persistent objects found within message 430 on the device for future use. For example, enterprise management agent 414 may store VSP information within its own database or in a persistent object store for the enterprise management agent 414.

The carrier policy manager 416 communicates with a database that may be located on an actual SIM within device 410. Such database is shown with reference 418 in the embodiment of FIG. 4. In other embodiments, the database 418 may be located on the device but may be populated when a SIM is inserted into device 410. As part of the carrier's configuration of UE 410, the carrier policy manager 416 may receive the second APN cellular configuration.

A virtual preload (VPL) of a VSP application may then occur. The virtual preload (VPL) may, in some embodiments, be provided to a user for the user's approval. In particular, as shown in FIG. 4, user 420 will receive message 436 asking whether or not the virtual preload for the VSP service is okay and if the user approves, as shown by message 438, then the procedure for installing the VSP service may continue.

The carrier information manager 416 may then request, from an application server 422, the VSP service application. Such request is shown by message 440. Application server 422 may be any remote server providing application data to a mobile device (i.e UE 410).

The application server 422 returns the VSP service application, as shown by message 442. Message 442 causes the application to be launched and installed on the device.

The launching may involve several processes. For example, VSP service 424 may, once launched, listen to the enterprise management agent 414 to determine whether the VSP information provided by the enterprise server 412 is okay, as shown by block 444. If yes, then the process may proceed to block 450 in which the VSP application is started.

As used herein, a VSP application is the entity that communicates with the VSP network component for virtual SIM information, including the virtual phone number. The VSP service interfaces with the system to give deep integration into the device. Such VSP service includes the user interface components, SMS, the second APN being brought up, among other functionality.

Referring again to FIG. 4, if the application is started successfully, as shown by block 452, then the VSP service 424 will activate a second APN interface, as shown by message 460. From FIG. 4, the virtual lines and bill split are now set up and ready to use.

The second data APN that is added to the enterprise_unsecure FIB may be represented as a logical interface in the system. The new work cellular interface is not secure since it is not pushed from an enterprise server and is over an unsecured carrier network.

The new interface may be assigned a type or label such as "cellular_work". This type allows the system services that deal directly with interfaces to be able to differentiate personal cellular and work cellular interfaces. In order to support such new interface, a new routing domain or FIB may be added in a multi-FIB device. For example, such new FIB may be considered a "enterprise_unsecure" FIB since it is was pushed by a carrier and is therefore considered by the enterprise to be an unsecure connection.

In this case, secure data may be sent over a separate interface, labelled as "enterprise_secure". Previously all unsecured communication would go over a personal connection. However, for billing purposes, now an enterprise_unsecure routing domain is provided to allow for certain data communications to be processed over such unsecured communication. The work cellular interface is then added to this FIB and other interfaces such as Wi-Fi or VPN interfaces from the Personal FIB may also be added to the new FIB.

Applications may then be assigned to the new FIB based on a group identifier associated with the application. Specifically, applications are assigned a group ID associated with a FIB. In many cases, an application will have a single group ID associated with a single FIB. However, in some cases hybrid applications or services may access multiple FIBs by having multiple group IDs associated with such application. Further, applications may be hybrid in which case they would permit communications over the enterprise_unsecure FIB or personal FIB.

In some situations, preference may be given to a particular FIB for hybrid applications. Such preference may be utilized, for example, to select a Enterprise FIB first. However, if the Enterprise FIB is overly busy or causes significant delay then a personal FIB may be utilized instead.

After such enterprise_unsecured FIB has been put on to the device, all data traffic that is routed over this FIB may then be accurately captured by the carrier and billed to the enterprise rather than to the personal account of the mobile device holder.

By using multiple routing domains or forward information bases, each perimeter or personality on the device may have its own routing table or domain, its own interface and its own interface priorities. In this case, traffic that proceeds over a personal FIB has different routing in place than traffic over other FIBs. Separate interface priorities allow a default route interface to be different for each FIB. This architecture also adds an extra level of security by not exposing interfaces to other FIBs.

Figure 5:
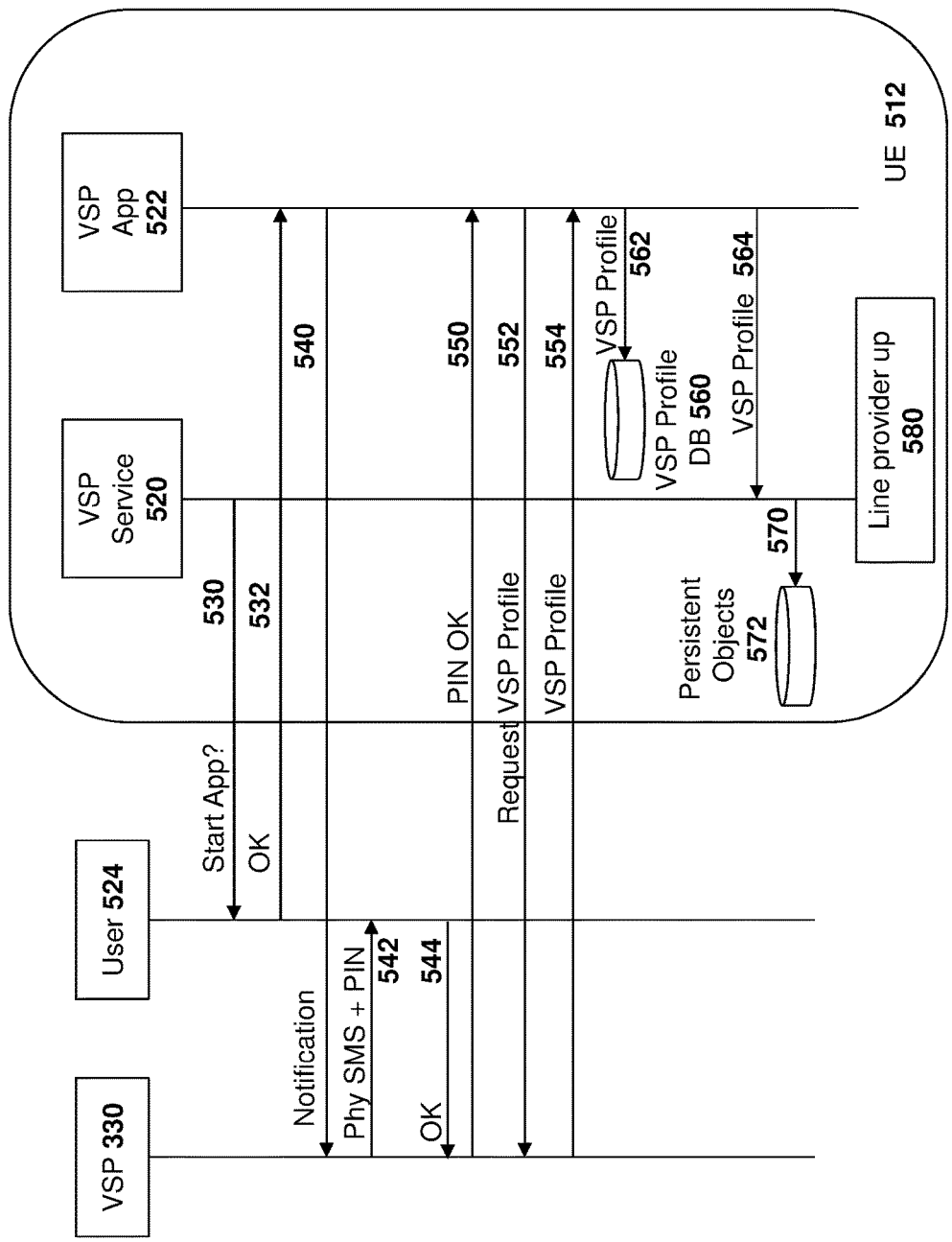
FIG. 5 is a data flow diagram showing activation of a VSP application to create a circuit switched connection.

Reference is now made to FIG. 5, which is a data flow diagram showing the enablement of voice on the VSP service. In particular, as seen in FIG. 5, a carrier includes a VSP server 330 which may communicate with UE 512.

UE 512 includes a VSP service 520 and a VSP application 522. A user 524 may in some cases be required to approve the services or activation of the services on the UE 512.

In particular, as seen in FIG. 5, a VSP service 520, when starting, may provide a notification to the user 524 as shown by message 530. Such message may be provided to the user to indicate whether or not it is acceptable to start the service. If the user approves, as shown by message 532, then the VSP application 522 may provide a notification 540 to the VSP server 330.

Once notification 540 is received, VSP server 330 may then, optionally, provide verification messages to user 524. These are shown by message 542 providing a text message to user 524 to confirm a PIN. A user confirmation is shown by message 544.

Messages 542 and 544 are optional. In other embodiments, when notification 540 is received by VSP server 330, VSP server 330 may automatically indicate to the VSP application 522 to continue.

In the embodiment of FIG. 5, if the PIN is okay then a message to continue is sent, as shown by message 550. VSP application 522 receives message 550 and requests a VSP profile for the UE 512, as shown by message 552.

VSP profile may include the secondary (or virtual) phone number and other information for the device and may be pushed to the device in message 554.

VSP application 522 receives message 554 and stores the VSP profile in a VSP profile database 560. Such storing is shown by message 562.

The VSP application 522 may then provide the VSP profile to the VSP service 520, as shown by message 564. The VSP service 520 may then store the VSP profile as a persistent object in the operating system of the UE 512, shown by message 570. The persistent object store is shown by block 572 in the embodiment of FIG. 5.

At this point, the line provider is up, as shown by block 580 and the secondary phone number may be utilized.

In some cases, the VSP profile of message 554 may be enabled by the enterprise server. In particular, the enterprise server may request certain phone numbers or reserve certain phone numbers and other information from the VSP server 330 to be pushed to UE 512.

The persistent objects within the operating system at block 572 may control the profile for certain uses. For example, the user interface may be changed on the device to allow for the calling from different numbers. Thus, an option may be given to user to phone from a first number from a second number. Further, text messaging or SMS applications may also be provided with two different numbers, and in some cases two different inboxes or application spaces may be provided for such separate SMS numbers. In some cases the first number may be used for a first bill and the second number may be used for a second bill.

Figure 6:
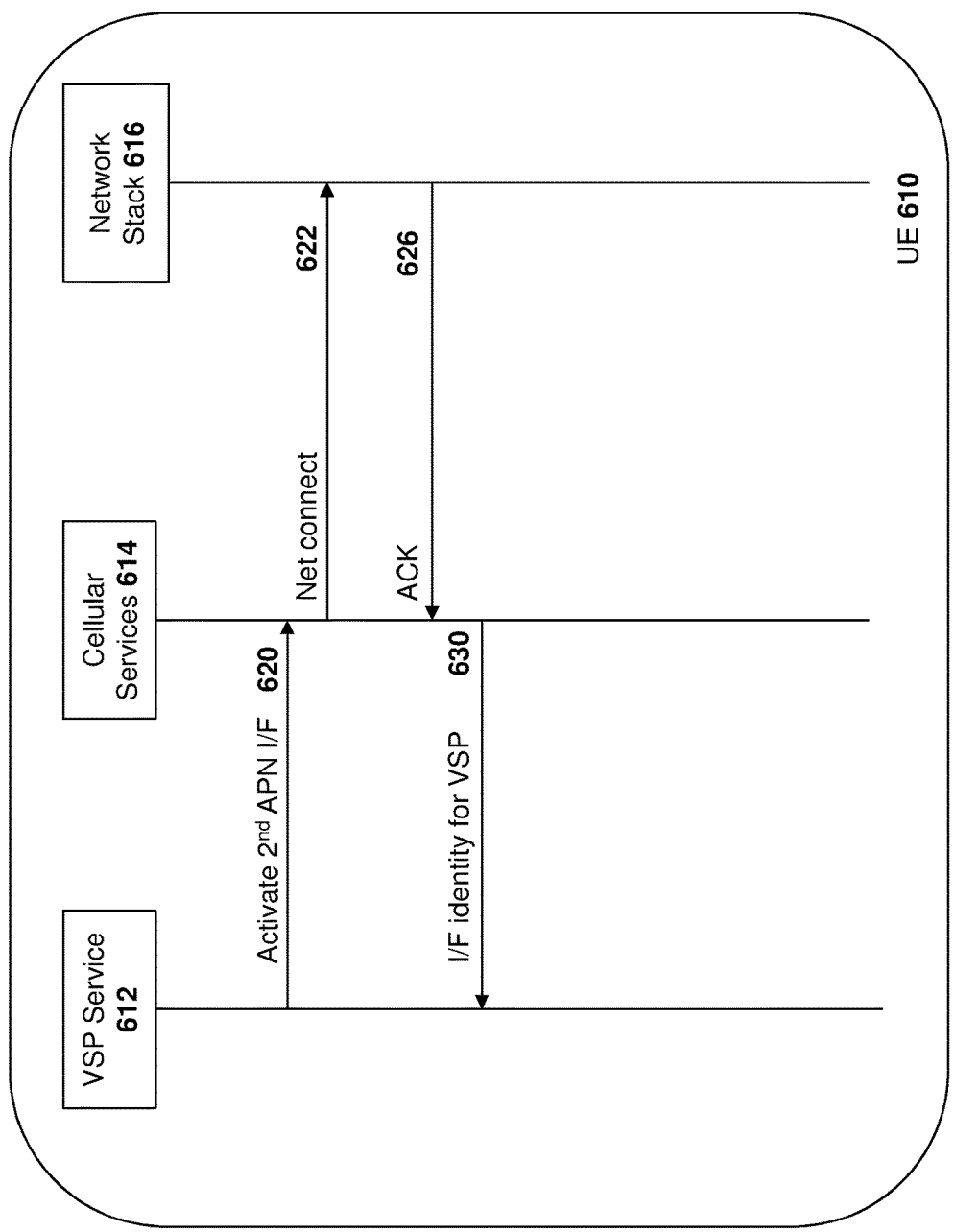
FIG. 6 is a data flow diagram showing configuration of an APN in a persistent object store.

Reference is now made to FIG. 6 which shows data enablement for the second APN. In particular, work data may flow over the second APN, as described above.

As seen in FIG. 6, a UE 610 includes the VSP service 612 that was installed, for example, as described in regards to FIG. 4. The device further includes a cellular services module 614, as well as a network stack 616.

In the embodiment of FIG. 6, once the second phone line is activated, the VSP service 612 may request the activation of the second APN interface from the cellular services module 614, as shown by message 620.

Cellular services module 614 receives message 620 and initiates the creation of the interface for the FIB as described above with the network stack 616, as shown by message 622. Message 622 may include information such as the interface, the FIB, and the type label, for example.

Once the persistent object has been stored, an acknowledgement 626 may be provided. The interface is then provided from the cellular service 614 to the VSP service 612, as shown by message 630.

The creation of the interface and the FIB may result in several factors. For data, once the data is enabled over the second APN, certain applications may select connections with the cellular work FIB as needed. For example, a VPN manager may be set to prefer the cellular work interface.

Further, certain device specific connections may also be set to select work cell connections as needed.

Further, enterprise_unsecured FIBs may have the personal cellular interface removed and the work cellular interface added, thereby ensuring that enterprise_unsecured messages are billed to the cellular work bill. Until the service is activated, exiting applications that normally would send enterprise_unsecure traffic would use a personal cellular interface in the enterprise_unsecure FIB to ensure they still have connectivity. In this way, when the VSP service is enabled, the application does not need to change.

While the above describes the creation and setting up of the second phone line and data APN, the device also may have procedures for power up and deletion of the services.

Figure 7:
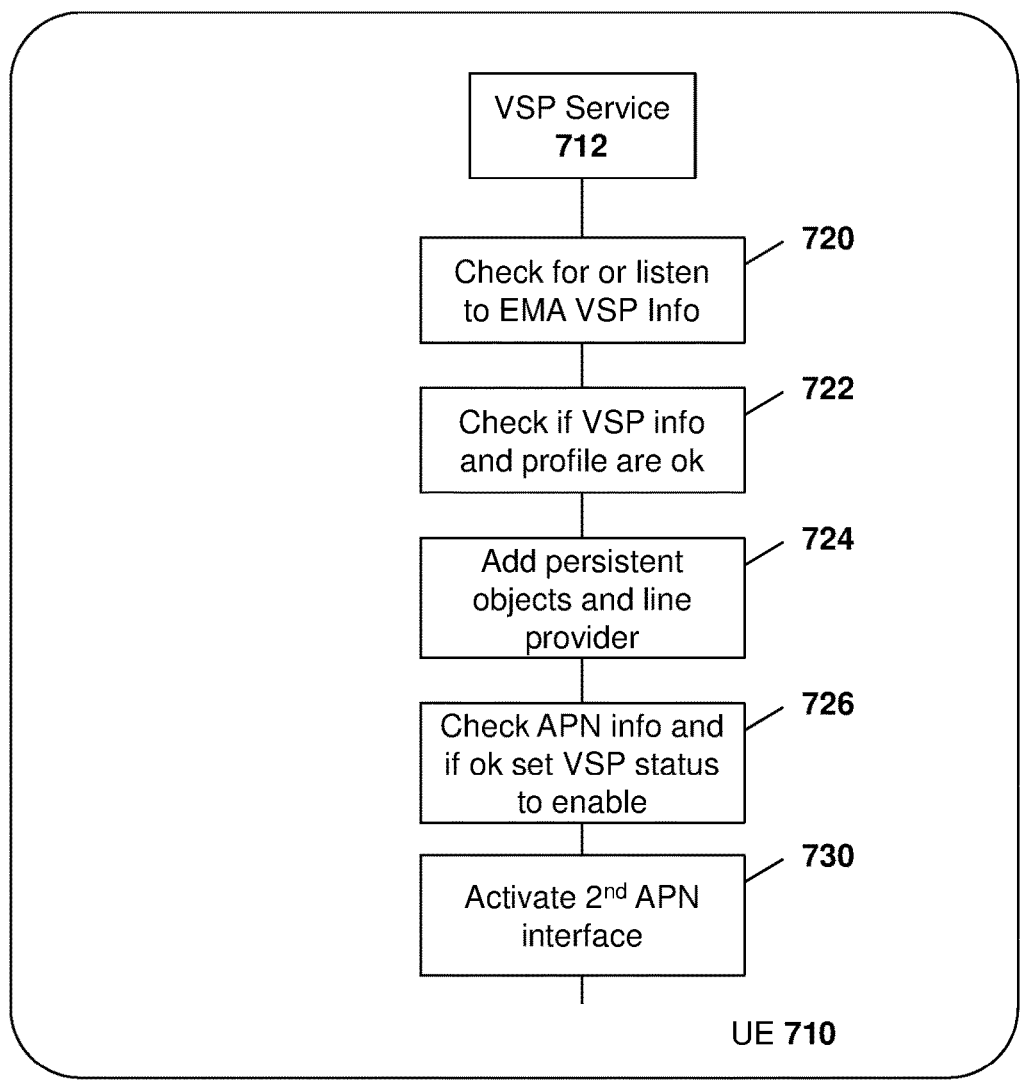
FIG. 7 is a data flow diagram showing the activation of a second data access point name (APN)

In particular, reference is now made to FIG. 7, which shows a process on a device for power up. As seen in FIG. 7, UE 710 includes VSP service 712. On power up, the device first checks and listens to the enterprise management agent, for example enterprise management agent 412 from FIG. 4 above, to determine whether or not the VSP information is okay, as shown by block 720.

If yes, the process of FIG. 7 proceeds to block 722 in which a check is made to determine whether the VSP information and the VSP profile are okay against the particular SIM that is inserted in the device. If yes, the process proceeds to block 724 in which the persistent objects are added and the line provider is brought up.

Once the line is active, the APN information is then checked as shown by block 626 in FIG. 6. If the second APN is okay then VSP status is set to enabled.

The process then proceeds to block 730 in which and the second APN interface is activated.

If any of the steps fail, then the VSP service is disabled and the device may consider that it is waiting for new VSP information from the enterprise server.

If, for example, a new SIM is inserted into the device, the new SIM may also be enabled for VSP. In this case, the enterprise server may also provide any new identifier such as the IMSI and the process as outlined in FIG. 4 may proceed to initialize the VSP service.

Figure 8:
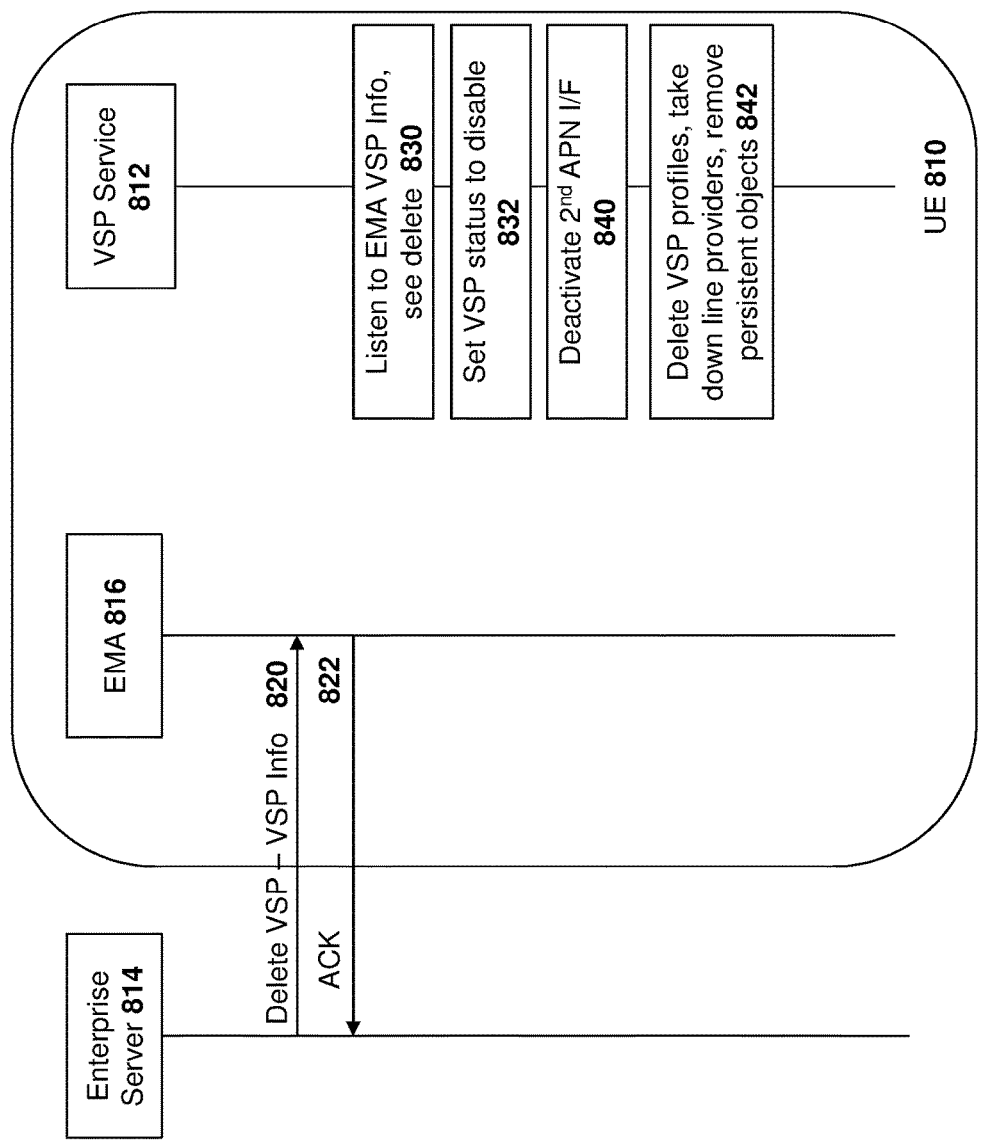
FIG. 8 is a data flow diagram showing the deletion of a VSP service from a device.

In a further embodiment, a VSP service may need to be deleted from a device. Reference is now made to FIG. 8. In particular, UE 810 may no longer be needed to be used by an enterprise. For example, the employee may leave the workplace and the employer may wish to remove the VSP service from the device.

In this regard, UE 810 communicates with enterprise server 814 using EMA 816 on the UE.

UE 810 further includes VSP service 812.

Enterprise server 814 may send a delete VSP command with information regarding the VSP service to the enterprise management agent 816, as shown by message 820. Enterprise management agent 816 may acknowledge message 820, as shown by message 822.

Enterprise management agent 816 then triggers the VSP service 812 to perform the deletion of the VSP application and settings. In particular, as shown by FIG. 8, the VSP service 812 listens to the enterprise management agent for VSP information and sees a deletion request, as shown by block 830. The VSP service 812 then sets the enablement of the VSP service to false as shown by block 832.

The VSP service 812 may then de-activate the second APN interface as shown by arrow 840 and may then delete the VSP profiles, take down line providers, remove the persistent objects in the operating system (including received SMS texts), among other tasks, as shown by block 842.

In one embodiment, the app may not be deleted. In other embodiments, the app may be deleted and may need to be retrieved again upon the device being connected to an enterprise server requiring the VSP services.

Figure 9:
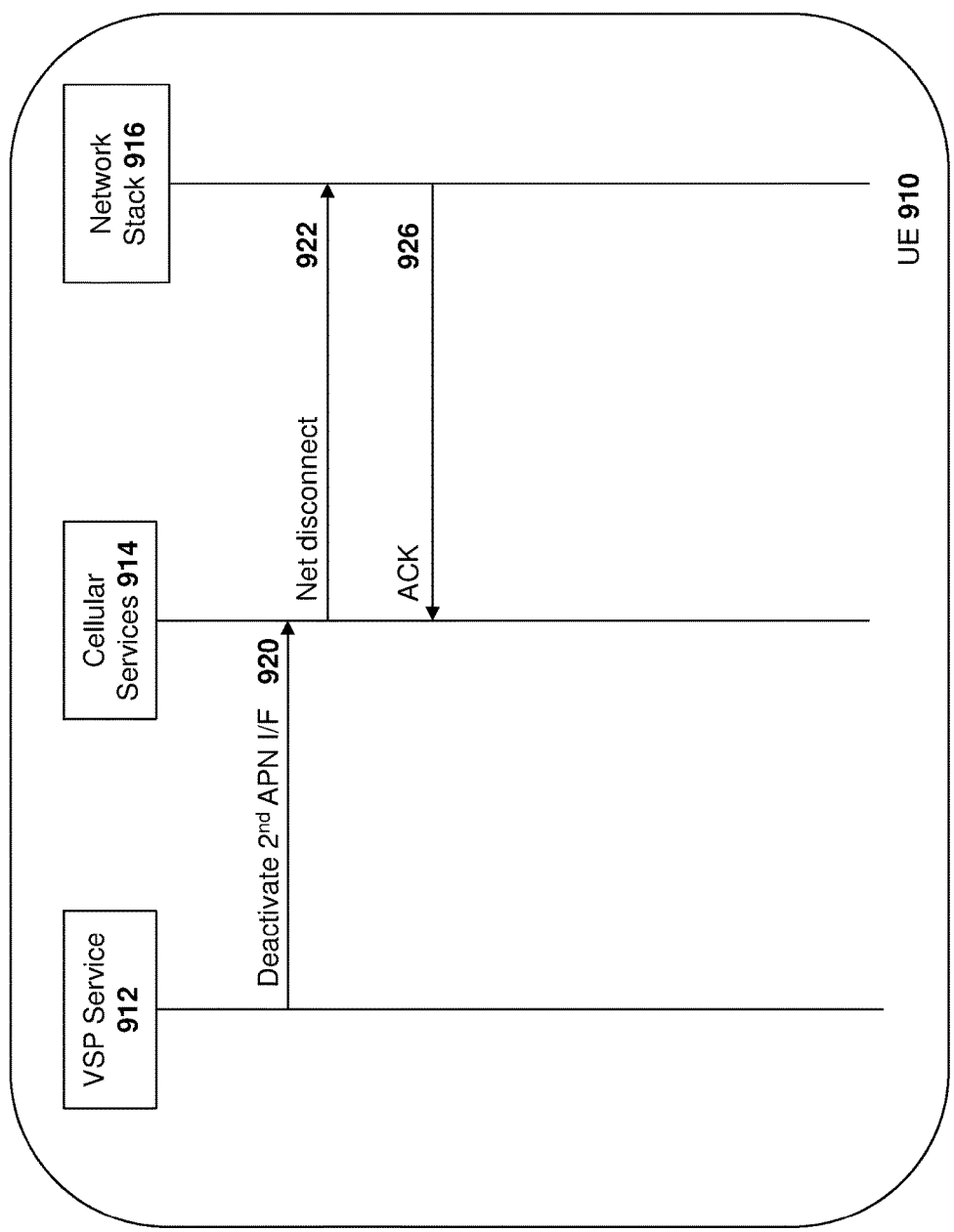
FIG. 9 is a data flow diagram showing deactivation of a second APN.

From FIG. 8 above, the deactivating of the second APN may be accomplished in accordance with FIG. 9. As seen in FIG. 9, UE 910 includes VSP service 912, cellular services modules 914 and the network stack 916.

In disabling the dual APN data, the VSP service 912 sends a message 920 to the cellular services module 914 to deactivate the second APN interface.

Cellular services module 914 then sends the network stack 916 a message to disconnect the interface FIB and parameters as shown by message 930.

The persistence manager may then acknowledge the message, as shown by message 926.

As will be appreciated, FIG. 9 shows the device side functionality. The carrier network (server side) functionality may include cleaning up the connection for the UE 910 once the VSP service is deactivated.

With the above, the insertion or removal of a SIM may cause the VSP to be activated or deactivated. In particular, the VSP service, upon hot SIM insertion, removes the VSP persistent objects in the operating system and disables the VSP service, removing any state with the second APN if the new SIM inserted does not match with the SIM the service was activated on. This way, if a user pulls the SIM and reinserts it, re-registration is not required and information with not be lost.

A hot SIM insertion would include the power on scenario as described above with regard to FIG. 7.

For a single APN, a counter may be introduced on the device. Thus, data travelling over a cellular interface would have a counter to indicate the amount of data that is sent/received for personal versus the amount of data that would be sent/received for work. As will be appreciated by those skilled in the art, for Wi-Fi connection, data counters are not needed since the Wi-Fi connection is not typically billed for data usage.

The data is recorded from device start up and keeps records of all applications that were run until shutdown. These records could then be harvested and reconciled for VSP infrastructure so that carrier billing may be achieved.

In an alternative embodiment to the above, a work device may be adapted to include a personal space. In this case, a bring your own number (BYON) or Corporate Owner Personal Enabled (COPE) scenario may exist in which the physical SIM is related to the work number and the virtual SIM created through the VSP is utilized for the personal services. In this manner, the correct cellular interface may be added to the appropriate FIB for data tracking.

In accordance with the above, one aspect of the present disclosure is the starting of the second APN.

As will be appreciated by those skilled in the art, the carrier configuration that is stored on the device may include APN information related to the SIM. The carrier may insert such information into the SIM when provisioning the device or selling the SIM to the device user. However, it would be ineffective to have all of these APNs reserved for the particular device if the VSP service on the device is not enabled.

Figure 10:
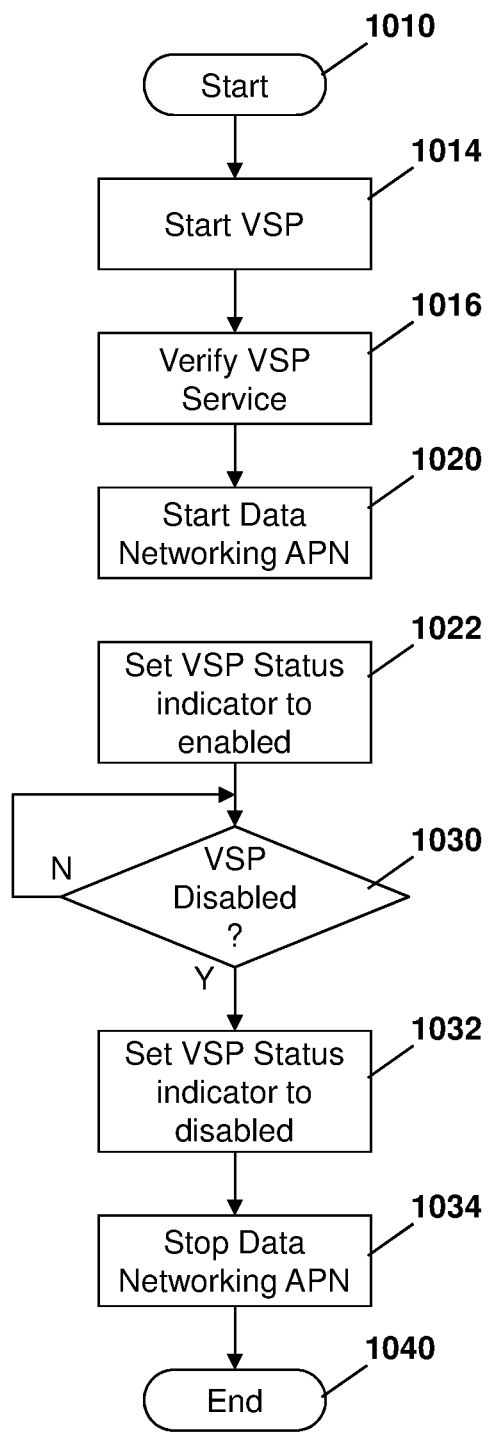
FIG. 10 is a process diagram showing the steps of activating and deactivating an APN.

Therefore, reference is now made to FIG. 10, which shows a process diagram for a process of enabling the second data APN on the device. From FIG. 10, the process starts at block 1010 and proceeds to block 1014 in which the device starts the VSP process. Such starting can include the configuration of the VSP process as described in FIG. 4 above.

From block 1014 the process proceeds to block 1016 in which the VSP service is verified. Such verification may include verifying the IMSI of the device and the PIN as described above.

From block 1016, the process proceeds to block 1020 in which the VSP daemon starts the data networking APN based on the configuration information for the carrier. The process then proceeds to block 1022 in which a system indicator is set indicating that the VSP is configured.

From a carrier perspective, the carrier does not enable or configure the APN until after the data networking APN is started on the UE. In this way, resources at the carrier are not wasted by having preconfigured APNs for devices that may not use them.

The process then proceeds to block 1030 in which a check is made to see whether or not the service has been disabled. If no, the process continues to loop to block 1030.

Conversely, once the service is shut down, the process proceeds to block 1032 in which the system indicator is set to disable the second APN and the process then proceeds to block 1034 in which the data networking APN is stopped. From block 1034 the process proceeds to block 1040 and ends.

The above therefore provides for split billing between a personal and work space by first starting the VSP service for voice, and once the VSP service for Voice is started, configuring the second data APN between the UE and the carrier.

While the above is described with regards to a work and personal space, the split billing could equally be used for a device having two or more users, where each user has application associated with them. In this way, each user could obtain a bill for the voice and data each uses on the device.

Further, while the above is described with regards to two spaces, in some embodiments more than two APNs and phone numbers could be associated with a device, and more than two bills generated. The startup and shut down procedures for a many identities is similar to that described above with regards to FIGS. 4 to 10.

The above may be implemented on any computing device. If the above is implemented on a user equipment, one example is provided with regard to FIG. 11.

UE 1100 may be a two-way wireless communication device having voice and data communication capabilities. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1100 is enabled for two-way communication, it may incorporate a communication subsystem 1111, including both a receiver 1112 and a transmitter 1114, as well as associated components such as one or more antenna elements 1116 and 1118, local oscillators (LOs) 1113, and a processing module such as a digital signal processor (DSP) 1120. Although not shown, communication subsystem 1111 may include additional components. For example, UE 1100 may comprise multiple receivers 1112 and/or transmitters 1114 to allow for simultaneous radio activity. In addition, as will be apparent to those skilled in the field of communications, the particular design of the communication subsystem 1111 will be dependent upon the communication network in which the device is intended to operate.

Network access requirements will also vary depending upon the type of network 1119. In some networks network access is associated with a subscriber or user of UE 1100. A UE may require one or more smart cards which can contain different applications such as a USIM, RUIM or a SIM application in order to operate on a network. The smart card interface 1144 is normally similar to a card-slot into which a smart card can be inserted and ejected. The smart card can have memory and hold many key configurations 1151, and other information 1153 such as identification, and subscriber related information.

Figure 11:
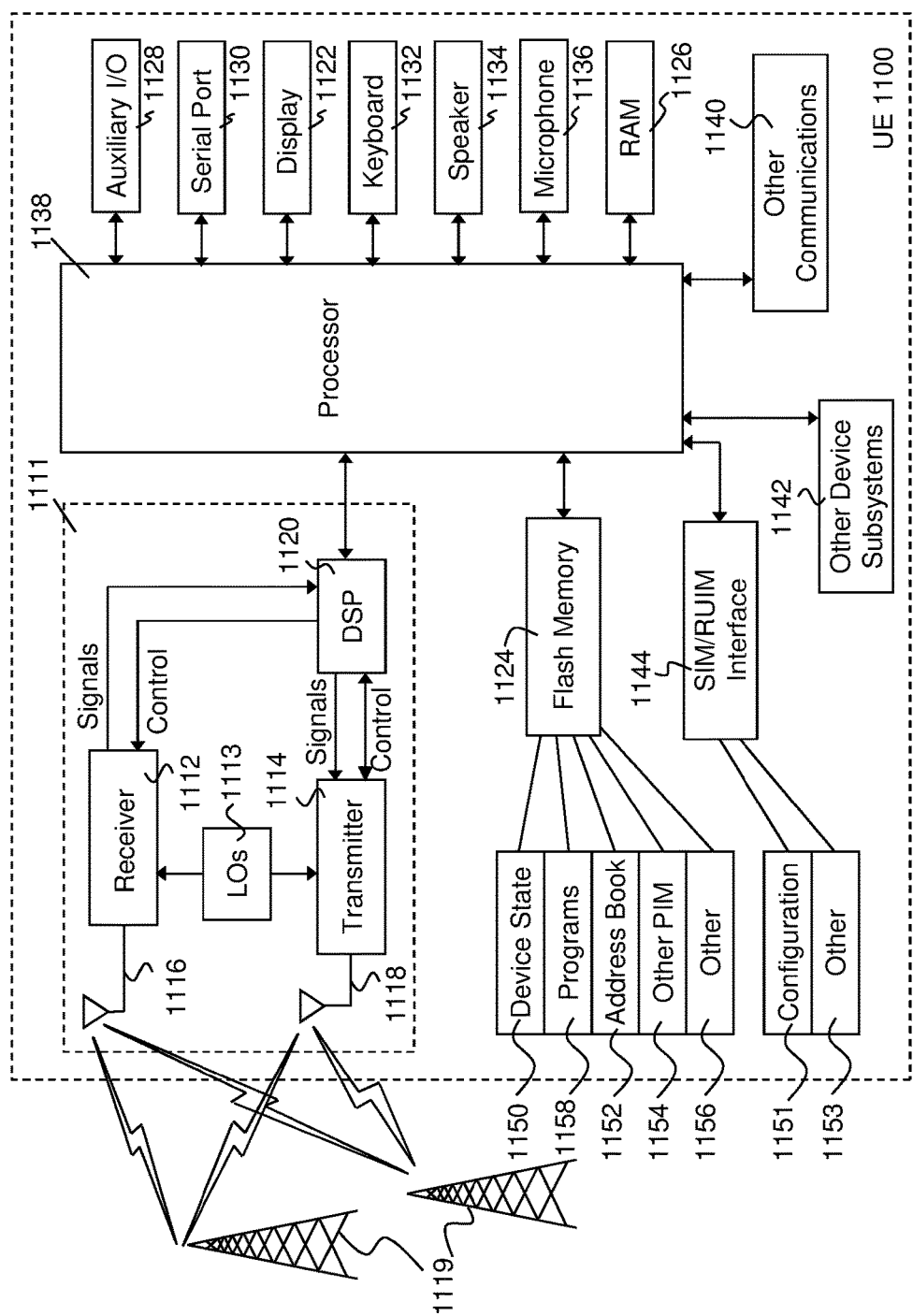
FIG. 11 is a block diagram of an example mobile device capable of being used with the embodiments of the present disclosure.

When required network registration or activation procedures have been completed, UE 1100 may send and receive communication signals over the network 1119. As illustrated in FIG. 11, network 1119 can consist of multiple base stations communicating with the UE.

Signals received by antenna 1116 through communication network 1119 are input to receiver 1112, which may perform such common receiver functions as signal amplification, frequency down conversion, filtering, channel selection and the like. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

UE 1100 generally includes a processor 1138 which controls the overall operation of the device. Communication functions, including data and voice communications, are performed through communication subsystem 1111. Processor 1138 also interacts with further device subsystems such as the display 1122, flash memory 1124, random access memory (RAM) 1126, auxiliary input/output (I/O) subsystems 1128, serial port 1130, one or more keyboards or keypads 1132, speaker 1134, microphone 1136, other communication subsystem 1140 such as a short-range communications subsystem and any other device subsystems generally designated as 1142. Serial port 1130 could include a USB port or other port known to those in the art.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the processor 1138 may be stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Processor 1138, in addition to its operating system functions, may enable execution of software applications on the mobile device. A predetermined set of applications that control basic operations, including at least data and voice communication applications for example, will normally be installed on UE 1100 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1119. Further applications may also be loaded onto the UE 1100 through the network 1119, an auxiliary I/O subsystem 1128, serial port 1130, short-range communications subsystem 1140 or any other suitable subsystem 1142, and installed by a user in the RAM 1126 or a non-volatile store (not shown) for execution by the processor 1138. Such flexibility in application installation increases the functionality of the device and may provide enhanced on-device functions, communication-related functions, or both. For example, secure communication applications may enable electronic commerce functions and other such financial transactions to be performed using the UE 1100.

In a data communication mode, a received signal such as a text message or web page download will be processed by the communication subsystem 1111 and input to the processor 1138, which may further process the received signal for output to the display 1122, or alternatively to an auxiliary I/O device 1128.

A user of UE 1100 may also compose data items such as email messages for example, using the keyboard 1132, which may be a complete alphanumeric keyboard or telephone-type keypad, whether virtual or real, among others, in conjunction with the display 1122 and possibly an auxiliary I/O device 1128. Such composed items may then be transmitted over a communication network through the communication subsystem 1111.

For voice communications, overall operation of UE 1100 is similar, except that received signals would typically be output to a speaker 1134 and signals for transmission would be generated by a microphone 1136. Alternative voice or audio I/O subsystems, such as a voice message recording subsystem, may also be implemented on UE 1100. Although voice or audio signal output is generally accomplished primarily through the speaker 1134, display 1122 may also be used to provide an indication of the identity of a calling party, the duration of a voice call, or other voice call related information for example.

Serial port 1130 in FIG. 11 would normally be implemented in a personal digital assistant (PDA)-type UE for which synchronization with a user's desktop computer (not shown) may be desirable, but is an optional device component. Such a port 1130 would enable a user to set preferences through an external device or software application and would extend the capabilities of UE 1100 by providing for information or software downloads to UE 1100 other than through a wireless communication network. The alternate download path may for example be used to load an encryption key onto the device through a direct and thus reliable and trusted connection to thereby enable secure device communication. As will be appreciated by those skilled in the art, serial port 1130 can further be used to connect the UE to a computer to act as a modem.

Other communications subsystems 1140, such as a short-range communications subsystem, is a further optional component which may provide for communication between UE 1100 and different systems or devices, which need not necessarily be similar devices. For example, the subsystem 1140 may include an infrared device and associated circuits and components or a Bluetooth™ communication module to provide for communication with similarly enabled systems and devices. Subsystem 1140 may further include non-cellular communications such as Wi-Fi or WiMAX.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment to facilitate activation and splitting of data billing between at least two parties, the method comprising:
   starting, at the user equipment, a virtual subscriber identity module platform ('VSP') service on the user equipment, the user equipment being configured with a first data networking Access Point Name ('APN') for a carrier network;
   verifying VSP configuration information with a network server;
   upon verification, starting a second data networking APN for the same carrier network based on the configuration information on the user equipment; and
   activating the splitting of data billing on the user equipment.

2. The method of claim 1, further comprising, prior to the starting, verifying enablement configuration from a network server.

3. The method of claim 2, wherein the enablement configuration includes an international mobile subscriber identity from a physical universal integrated circuit card (UICC) subscriber identity module (SIM) application.

4. The method of claim 2, wherein the network server is an enterprise management agent (EMA) server.

5. The method of claim 1, wherein the starting is based on a policy received from an enterprise server.

6. The method of claim 5, wherein the at least two parties include a user of the user equipment and an enterprise.

7. The method of claim 1, wherein the starting includes associating a forwarding information base ('FIB') for the second data networking APN with applications on the user equipment.

8. The method of claim 1, further comprising, when one of the at least two parties leaves the splitting of data billing, deactivating the second data networking APN.

9. The method of claim 8, wherein:
   the activating the splitting of data billing comprises setting a status indicator on the user equipment to indicate the VSP service is enabled; and
   the deactivating includes setting the status indicator on the user equipment to indicate the VSP service is disabled.

10. A user equipment configured with a first data networking Access Point Name ('APN') for a carrier network and configured to facilitate activation and splitting of data billing between at least two parties, the user equipment comprising
    a processor; and
    a communications subsystem,
    wherein the user equipment is configured to:
    start a virtual subscriber identity module platform ('VSP') service on the user equipment;
    verify VSP configuration information with a network server;
    upon verification, start a second data networking APN for the same carrier network based on the configuration information on the user equipment; and
    activate the splitting of data billing on the user equipment.

11. The user equipment of claim 10, wherein the user equipment is further configured to, prior to the starting, verify enablement configuration from a network server.

12. The user equipment of claim 11, wherein the enablement configuration includes an international mobile subscriber identity from a physical universal integrated circuit card (UICC) subscriber identity module (SIM) application.

13. The user equipment of claim 11, wherein the network server is an enterprise management agent (EMA) server.

14. The user equipment of claim 10, wherein the user equipment is configured to start based on a policy received from an enterprise server.

15. The user equipment of claim 14, wherein the at least two parties include a user of the user equipment and an enterprise.

16. The user equipment of claim 10, wherein the user equipment is configured to start by associating a forwarding information base ('FIB') fur the second data networking APN with applications on the user equipment.

17. The user equipment of claim 10, further configured to, when one of the at least two parties leaves the splitting of data billing, deactivate the second data networking APN.

18. The user equipment of claim 17, wherein:
the user equipment is configured to activate the splitting of data billing by setting a status indicator on the user equipment to indicate the VSP service is enabled; and
the user equipment is configured to deactivate by setting the status indicator on the user equipment to indicate the VSP service is disabled.

19. A non-transitory computer readable medium comprising processor-executable instructions that, when executed by a processor of a user equipment, are configured to facilitate activation and splitting of data billing between at least two parties, the instructions providing:

starting, at the user equipment, a virtual subscriber identity module platform ('VSP') service on the user equipment, the user equipment being configured with a first data networking Access Point Name ('APN') for a carrier network;

verifying VSP configuration information with a network server;

upon verification, starting a second data networking APN for the same carrier network on the configuration information on the user equipment; and activating the splitting of data billing on the user equipment.

20. The non-transitory computer readable medium of claim 19, wherein the instructions further provide, prior to the starting, verifying enablement configuration from a network server.

* * * * *